(12) United States Patent
Tobiason et al.

(10) Patent No.: US 7,217,041 B2
(45) Date of Patent: May 15, 2007

(54) FIBER-OPTIC ALIGNMENT WITH DETECTOR IC

(75) Inventors: Joseph Daniel Tobiason, Woodinville, WA (US); Patrick H. Mawet, Snohomish, WA (US); Bjorn E. B. Jansson, Snohomish, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 89 days.

(21) Appl. No.: 11/235,056

(22) Filed: Sep. 26, 2005

(65) Prior Publication Data

US 2007/0071390 A1    Mar. 29, 2007

(51) Int. Cl.
G02B 6/36     (2006.01)
G02B 6/12     (2006.01)
G02B 6/26     (2006.01)
G02B 6/42     (2006.01)

(52) U.S. Cl. .................. 385/89; 385/14; 385/15; 385/52; 385/88; 385/90; 385/91; 385/92

(58) Field of Classification Search .................. 385/14, 385/15, 52, 88–92
See application file for complete search history.

(56) References Cited

U.S. PATENT DOCUMENTS

| | | | |
|---|---|---|---|
| 4,695,120 A | 9/1987 | Holder | |
| 5,123,067 A | 6/1992 | Avelange et al. | |
| 5,241,614 A | 8/1993 | Ecker et al. | |
| 5,883,395 A | 3/1999 | Krause | |
| 6,906,315 B2 | 6/2005 | Tobiason | |
| 2003/0072537 A1* | 4/2003 | Eichenberger et al. | 385/89 |

* cited by examiner

Primary Examiner—Frank G. Font
Assistant Examiner—Jerry Martin Blevins
(74) Attorney, Agent, or Firm—Christensen O'Connor Johnson Kindness PLLC

(57) ABSTRACT

A method for connecting optical signals carried by optical fibers between an optical encoder readhead and an optical signal processing IC having a plurality of photodetector portions arranged in a photodetector configuration. The optical signal processing IC is fixed to a substrate at a first position and orientation. Then, a reference-surface block including at least one reference surface is fixed to the substrate in a second orientation and position based on the first position and orientation. A fiber-optic end piece is provided, which has at least one corresponding-reference surface and a plurality of optical fiber locating features that are arranged relative to the corresponding-reference surface. A plurality of the optical fibers are fixed to the plurality of optical fiber locating features to provide a coupling configuration of optical fiber ends that nominally matches the photodetector configuration. Finally, the corresponding-reference surface of the fiber-optic end piece is mounted against the reference surface of the reference-surface block such that the coupling configuration abuts the photodetector configuration.

20 Claims, 7 Drawing Sheets

FIBER-OPTIC ALIGNMENT WITH DETECTOR IC

FIELD OF THE INVENTION

This invention relates generally to optical fiber encoders, and more particularly to a method of aligning optical fibers used as receiver elements to a detector IC in optical fiber encoders.

BACKGROUND OF THE INVENTION

Various movement or position encoders for sensing linear, rotary or angular movement are currently available. These encoders are generally based on either optical systems, magnetic scales, inductive transducers, or capacitive transducers.

For optical encoders, a number of systems have been developed. One recent system is an all optical encoder that is of a small size in addition to having a number of other desirable features, as disclosed in co-assigned U.S. Pat. No. 6,906,315, which is incorporated herein by reference (hereinafter "the '315 patent"). In an all optical encoder, optical signals are transmitted through a plurality of optical fibers to a photodetector device. In the past, there has been some difficulty in precisely aligning each end of the plurality of optical fibers with a corresponding photodetector portion in the photodetector device. The present invention is directed to providing a method and arrangement to overcome such difficulty.

SUMMARY OF THE INVENTION

In accordance with various exemplary embodiments of the present invention, a method is provided for connecting optical signals carried by optical fibers between an optical encoder readhead and an optical signal processing circuit including an optical signal processing IC. In one embodiment, the method includes generally five steps. First, an optical signal processing IC is provided, which has a plurality of photodetector portions arranged in a photodetector configuration. Second, the optical signal processing IC is fixed to a substrate at a first position and orientation. Third, a reference-surface block is fixed to the substrate in a second orientation and position corresponding to the first position and orientation. The reference-surface block includes at least a first reference surface. Fourth, a fiber-optic end piece is provided, which has at least a first corresponding-reference surface and a plurality of optical fiber locating features. The optical fiber locating features are arranged relative to the first corresponding-reference surface and in a configuration that corresponds to the photodetector configuration. Fifth, a plurality of the optical fibers are arranged based on the plurality of optical fiber locating features to provide a coupling configuration of optical fiber ends that nominally matches the photodetector configuration such that when the first corresponding-reference surface of the fiber-optic end piece is mounted against the first reference surface of the reference-surface block, the coupling configuration may abut and align with the photodetector configuration.

The present invention, as described above, permits easy, economical and properly-aligned coupling of the optical fibers and the detector IC by the use of a fiber-optic end piece that receives the optical fibers in a predefined (e.g., spaced-apart) arrangement, which in turn can be readily received in an alignment block arrangement including the detector IC. By combining the fiber-optic end piece with the alignment block arrangement using their respective reference surfaces, one can readily position the optical fibers relative to the detector IC in proper alignment.

According to one aspect of the present invention, the reference-surface block further includes a second reference surface, and the fiber-optic end piece further includes a second corresponding-reference surface relative to which the plurality of optical fiber locating features are arranged. The second corresponding-reference surface of the fiber-optic end piece is then mounted against the second reference surface of the reference-surface block.

According to another aspect of the present invention, the plurality of optical fiber locating features are provided in the form of V grooves.

According to a further aspect of the invention, the optical fiber ends of the plurality of the optical fibers are polished together, after they are received and fixed in the plurality of optical fiber locating features.

According to yet another aspect of the present invention, an alignment block arrangement is provided for connecting optical signals carried by optical fibers between an optical encoder readhead and an optical signal processing circuit including an optical signal processing IC having a plurality of photodetector portions arranged in a photodetector configuration. The alignment block arrangement includes generally three elements: a substrate; an optical signal processing IC fixed to the substrate at a first position and orientation; and a reference-surface block fixed to the substrate in a second orientation and position corresponding to the first position and orientation. The reference-surface block has at least a first reference surface, which is configured to abut a first corresponding-reference surface of a fiber-optic end piece having the optical fibers arranged relative to the first corresponding-reference surface and in a configuration that corresponds to the photodetector configuration.

According to still another aspect of the present invention, a fiber-optic end piece is provided, for connecting optical signals carried by optical fibers between an optical encoder readhead and an optical signal processing circuit including an optical signal processing IC having a plurality of photodetector portions arranged in a photodetector configuration. The fiber-optic end piece consists of a body having first and second corresponding-reference surfaces and a plurality of optical fiber locating features arranged relative to the first and second corresponding-reference surfaces and in a configuration that corresponds to the photodetector configuration.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
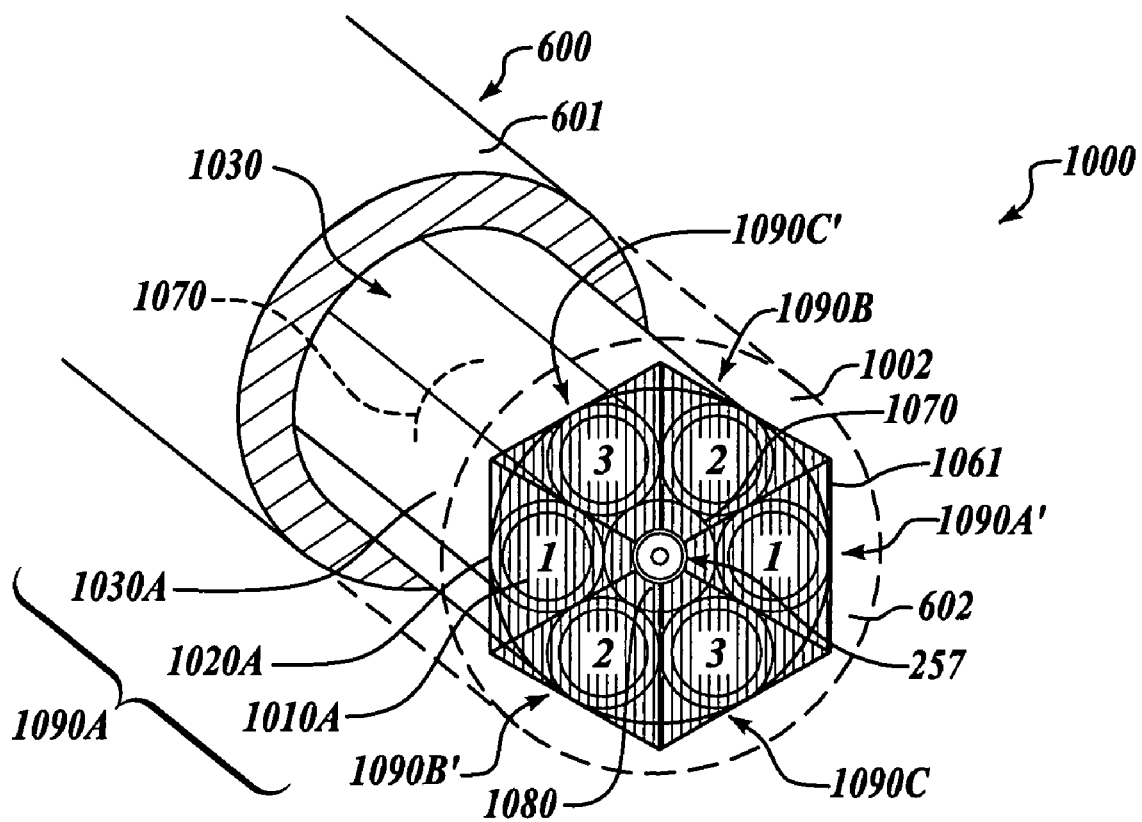
FIG. 1 is a partly orthographic, partly isometric view of one embodiment of a fiber optic encoder readhead arrangement.

FIG. 1 illustrates one embodiment of a fiber-optic readhead arrangement 1000 as disclosed in the '315 patent, incorporated herein by reference above. As shown in FIG. 1, the fiber-optic readhead arrangement 1000 includes three fiber-optic receiver channels, each consisting of a "balanced pair" of fiber-optic receiver channels. Specifically, the readhead arrangement 1000 includes a first set of three fiber-optic receiver channels 1090A–1090C, and a second set of three respective balanced fiber-optic receiver channels 1090A'–1090C' that are respectively arranged in "balanced pairs" on opposite sides of the illumination field center 257 from the respective fiber-optic receiver channels 1090A–1090C. The pairs of numbers 1—1, 2—2, and 3—3 shown on the optical fiber receiver apertures 1010 (only the aperture 1010A of the receiver channel 1090A is shown) are indicative of the balanced pairs.

Also shown in FIG. 1 is a readhead housing 600 comprising a cylindrical ferrule 601, shown partially in dashed outlined cutaway. The inner diameter of the ferrule fits with a slight-interference-fit over the close-packed receiver optical fibers 1030 and a source fiber 1070. In one exemplary assembly method, the fibers are inserted and aligned in the ferrule 601 from the back end and inserted until they protrude slightly beyond a mounting surface 602. Then, the phase mask element 1061 is aligned to the fiber ends under a microscope and bonded tight to the mounting surface 602. In one exemplary embodiment, the phase masks 1020 (only the mask 1020A for the optical fibers 1030A of the receiver channel 1090A is shown) are fabricated on the "inside" of the phase mask element 1061, nearest the fiber ends.

A light source 1080 is provided by the end of the source fiber 1070. In one exemplary embodiment, the source fiber 1070 is a single mode fiber used as a point source for emitting light at a source wavelength of 635 nm, and has an outer diameter of $D_{SF}=250$ microns. The receiver optical fibers 1030 are all the same commercially available multimode fiber that is a silica fiber with 200/220/250 micron core/cladding/buffer diameters $D_{RA}/D_{RC}/D_{RF}$. Thus, all of the source and receiver fibers in the fiber-optic readhead arrangement 1000 have the same 250 micron outer diameter and can therefore be arranged in an advantageous close packing assembly arrangement that allows both highly accurate and economical precision alignment and assembly. In the illustrated embodiment, the advantageous close packing assembly arrangement is a hexagonal close packing assembly arrangement. It should be appreciated that an assembly such as the fiber-optic readhead arrangement 1000 provides a high resolution all optical encoder readhead in a diameter of 1.0 mm or less. The fiber-optic readhead arrangement 1000 also provides a high level S/N ratio. The fiber-optic readhead arrangement 1000 is exemplary only, and not limiting. Additional fiber-optic readhead arrangements and related teachings are described in the '315 patent, for example.

Figure 2:
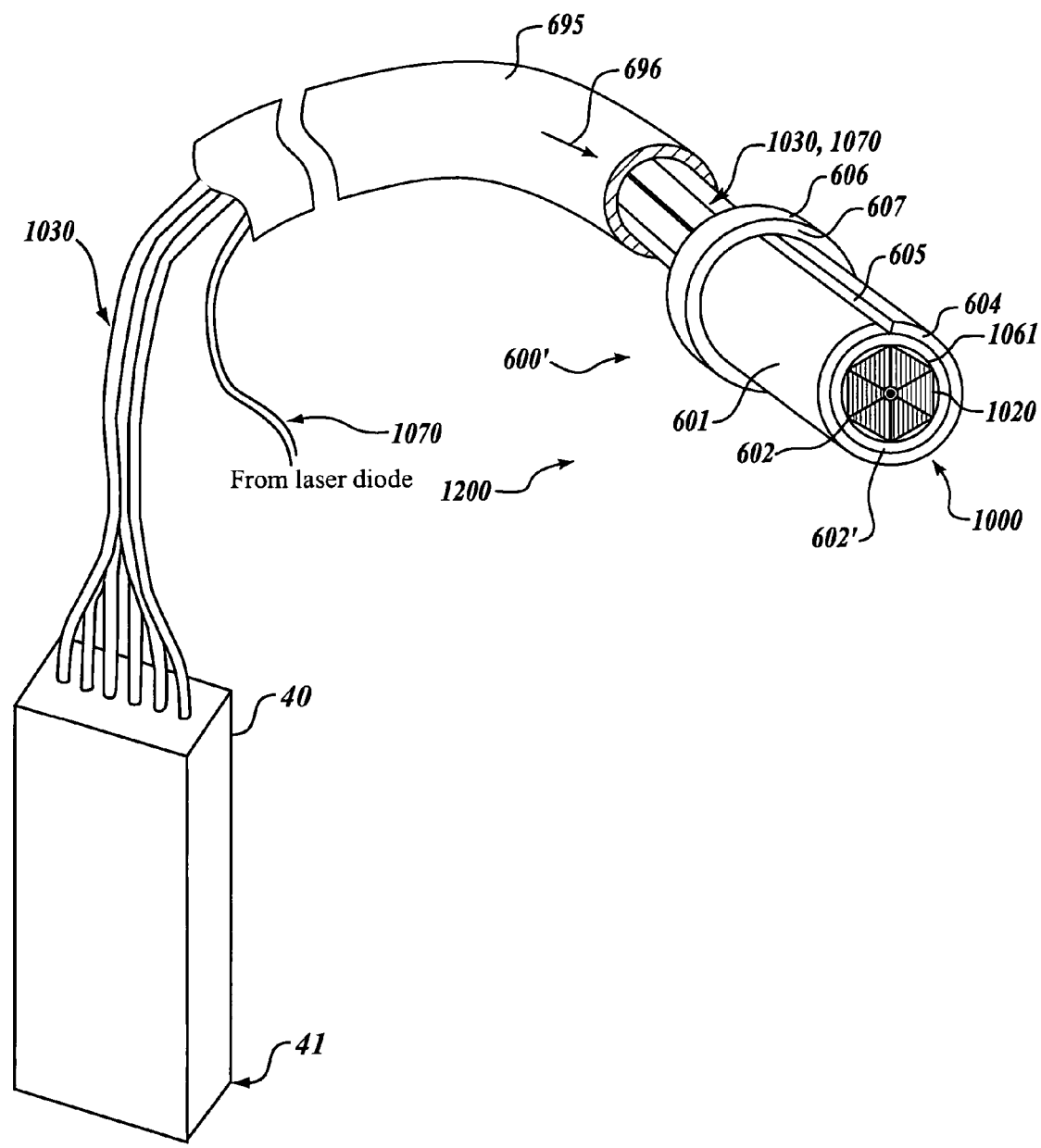
FIG. 2 shows one embodiment of a fiber-optic readhead and cable according to the present invention.

FIG. 2 shows one embodiment of a fiber-optic readhead and cable 1200 according to some exemplary embodiments of the present invention. The fiber-optic readhead and cable 1200 includes the readhead arrangement 1000, as described above in reference to FIG. 1, a cable 695, and a fiber-optic end piece 40 having an end surface 41. The light source 1080 provided by the end of the source fiber 1070 (see FIG. 1) emits the source light to illuminate a scale grating (not shown), and the light reflected from the scale grating travels to a receiver plane 1002 (see FIG. 1) of the readhead arrangement 1000.

An end surface 602' of the readhead arrangement 1000 may include a chamfer 604 so that the readhead housing 600' is easier to insert into a hole in a mounting ring or fixture (not shown.) The readhead housing 600' further includes a mounting stop 606 having a surface 607 for stopping the readhead housing 600' at the proper depth in the mounting ring or fixture. The ferrule 601 includes an alignment groove 605 which aids mounting alignment in various applications. The alignment groove 605 is relatively precisely aligned with respect to the orientation of the bars of the phase masks 1020. The optical fibers 1030 and 1070 extend from the back of the ferrule 601 and/or mounting stop 606 and into the readhead cable 695 shown in cutaway, which is a typical commercial fiber optic bundle jacket in various exemplary embodiments. The source fiber 1070 is coupled to carry light from a light source, such as a laser diode. Further, according to various exemplary embodiments of the present invention, the receiver optical fibers 1030 (six are shown in FIG. 2) are coupled to a fiber-optic end piece 40, to be described in detail in reference to FIGS. 3A and 3B below. Still referring to FIG. 2, as indicated by the arrow 696, the jacket of the cable 695 is inserted and bonded into an enlarged diameter at the rear of the readhead housing 600' and fixed in place by adhesive or the like to provide protection. The cable 695 may extend for tens of meters or more in various applications without appreciable signal loss.

As described above, the fiber optic readhead and cable 1200 provides a miniature fiber optic readhead usable in an industrial environment. Also as described above, it should be appreciated that the outer diameter of the readhead housing ferrule 601 and/or mounting stop 606 may easily be made as small as 1 to 2 mm. Thus, in one embodiment, the readhead housing 600' may be assembled into an industry standard PM-FC connector for further installation, mounting, alignment, and connection.

Figure 3A:
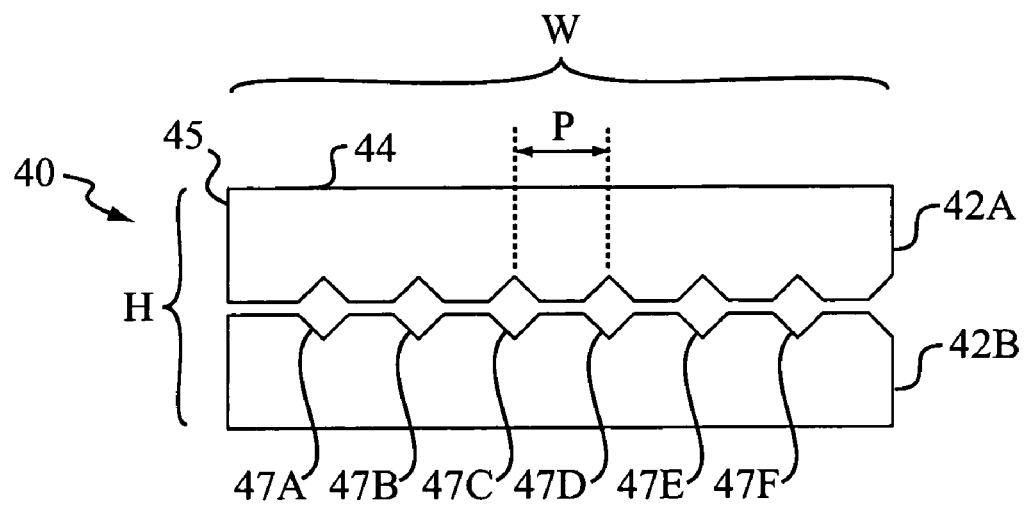
FIG. 3A is a cross-sectional view of a fiber-optic end piece as illustrated in FIG. 2, formed of a silicon V groove array.

FIG. 3A is a cross-sectional view of the fiber-optic end piece 40, formed in accordance with one embodiment of the present invention. The fiber-optic end piece 40 includes optical fiber locating features, for example silicon V grooves, in which the receiver optical fibers 1030 can be mounted and secured for proper alignment. One advantage of micro-fabricated silicon V grooves is that they provide for micron or sub-micron alignment of the receiver fibers. Another advantage of such technologies is their relatively low cost due to their widespread use and mass production in the telecommunications industry.

In the illustrated embodiment, the fiber-optic end piece 40 consists of two identical V groove chips 42A and 42B each having six V grooves, which may be made using basic MEMs technology such as photolithography and etching to fabricate mechanical structures from silicon (see "Silicon as a mechanical material", *Proc. IEEE* 70(5) (1982)), or from a material such as brass, with the grooves fabricated by machining or embossing, or the like. The V groove chips 42A and 42B are arranged so that their grooved surfaces face each other to together form six channels 47A–47F, for respectively receiving the six receiver optical fibers 1030 as illustrated in FIG. 2. The V groove chip 42A may have a desired and/or known thickness dimension such that the six channels 47A–47F are located at a desired and/or known dimension or relationship relative to a surface 44 of the end piece 40. The six channels 47A–47F may also be located at a desired and/or known dimension or relationship relative to a surface 45 of the end piece 40. The surface 44 and/or 45 may provide one or more corresponding-reference surfaces that may be located against a corresponding reference surface of a reference-surface block, in order to obtain proper alignment between the configuration of receiver optical fibers 1030 included in the end piece 40 and a similar configuration of photodetectors included in a detector IC, as described in greater detail below. The receiver optical fibers 1030 may be fixed in the channels 47A–47F (i.e., one embodiment of "the optical fiber locating features") using any suitable means, for example by adhesive bonding and/or clamping.

Figure 3B:
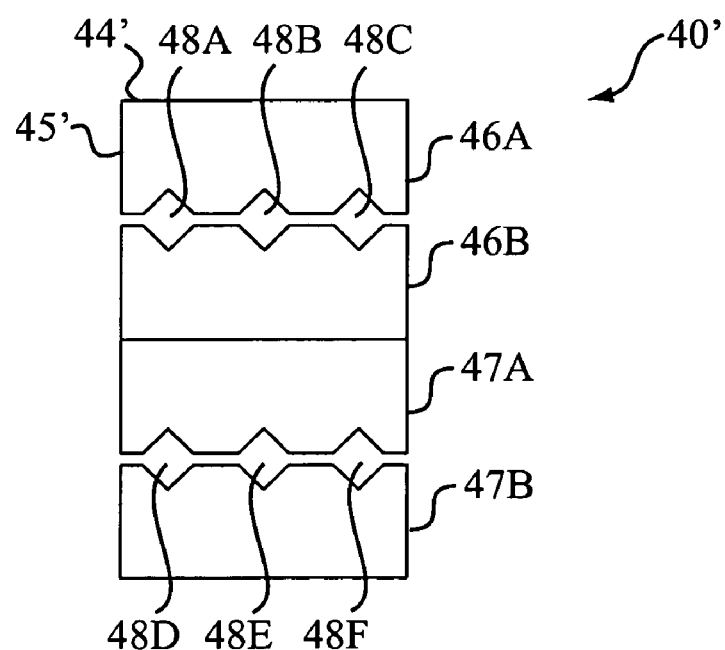
FIG. 3B is a cross-sectional view of another embodiment of a fiber-optic end piece, formed of a silicon V groove array.

It should be understood that the number of optical fiber locating features (e.g., channels) to be provided in a fiber-optic end piece 40 is not limited to six, and may vary depending on the number of receiver optical fibers 1030, and/or power monitoring fibers or the like, that are to be routed to photodetectors in each application. It should further be understood that the arrangement of the optical fiber locating features is not limited to the embodiment shown in FIG. 3A. For example, FIG. 3B shows another embodiment of a fiber-optic end piece 40', which consists of two pairs of identical V groove chips 46A/46B and 47A/47B. The pair of V groove chips 46A and 46B is arranged so that the pair's grooved surfaces face each other to together form three channels 48A–48C. Similarly, the pair of V groove chips 47A and 47B is arranged so that the pair's grooved surfaces face each other to together form three channels 48D–48F. Similarly to the end piece 40, the V groove chips 46A, 46B, 47A and 47B may have a desired and/or known thickness dimensions such that the six channels 48A–48F are located at a desired and/or known dimensions relative to a surface 44' of the end piece 40'. The six channels 48A–48F may also be located at a desired and/or known dimension or relationship relative to a surface 45' of the end piece 40'. The surface 44' and/or 45' may provide one or more corresponding-reference surfaces that may be located against a corresponding reference surface of a reference-surface block, in order to obtain proper alignment between the configuration of receiver optical fibers 1030 included in the end piece 40' and a similar configuration of photodetectors included in a detector IC.

As this example demonstrates, the number and arrangement of optical fiber locating features to be provided in a fiber-optic end piece may be varied depending on each application. It should further be understood that V groove blocks and/or other suitable alignment components may be made from materials other than silicon or brass. Thus, a fiber-optic end piece 40 may be formed of any material that is now available or may be developed in the future, and its optical fiber locating features may be of any geometric configuration as long as they can receive the receiver optical fibers 1030 in a proper relationship relative to each other and to at least one surface of the end piece 40 that can be positioned against a reference surface, to obtain proper alignment of the end piece 40 with a detector IC 51, as described in greater detail below.

In one embodiment of the fiber-optic end piece 40 as shown in FIG. 3A, the width "W" and height "H" of the cross section of the fiber-optic end piece 40 are about 3.5 mm and about 2 mm, respectively, and the pitch "P" between two adjacent channels is about 500 um.

In one embodiment, during an initial phase of assembly, the receiver fiber ends may protrude slightly from the end face 41 (see FIG. 2) of the fiber-optic end piece 40 (or 40'), and the receiver fiber ends (and the end face 41) may then be polished so that the fiber ends are nominally flush with the end face 41 and normal to the fiber axes. Polishing all of the fiber ends together may be beneficial in achieving uniformity in the coupling efficiency among different fiber ends. Also, if some additional surface finishing is desired, such can be applied to all of the fiber ends at the same time at the end face 41 of the fiber-optic end piece 40. The end face 41 of the fiber-optic end piece 40 may then be rested directly against a surface of an IC detector, to be described below, so that the receiver optical fibers 1030 in the fiber-optic end piece 40 are individually and collectively in proper alignment with the corresponding photodetector portions of the IC detector.

Figure 4:
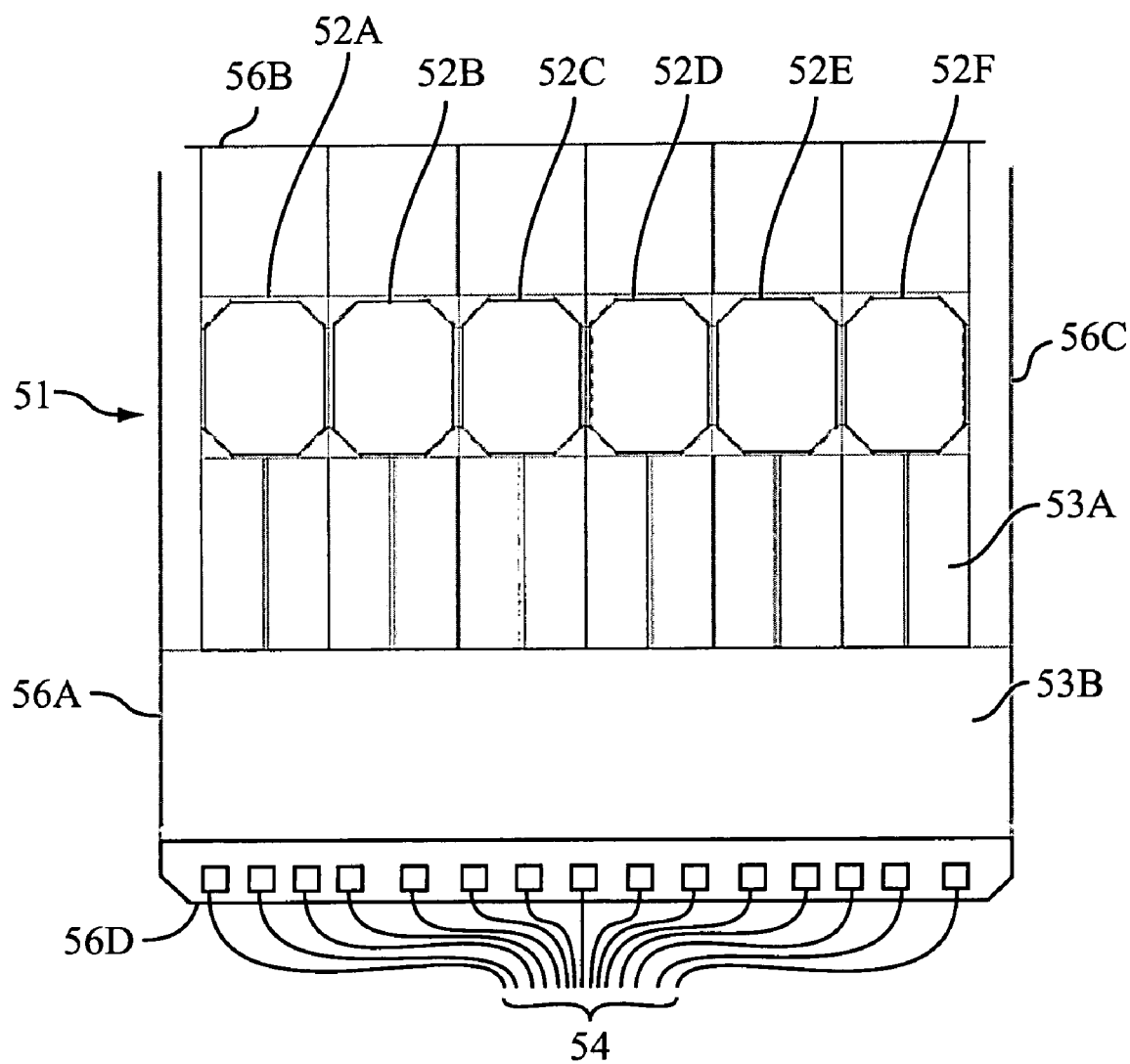
FIG. 4 shows a sample detector IC layout according to the present invention.

FIG. 4 shows an exemplary layout of a detector IC 51 to be coupled with the fiber-optic end piece 40, according to one embodiment of the present invention. As described above, the optical fiber cable 695 may extend for tens of meters or more in various applications, and therefore the detector IC 51 may be remotely located from the readhead arrangement 1000, or the like, though in other applications it may be located adjacent to the readhead arrangement. FIG. 4 essentially shows only the photodetector portions 52A–52F, which are configured to be coupled with the six receiver optical fibers 1030, respectively, and wiring regions 54. It should be understood that the number and arrangement of photodetector portions 52 are not limited to those as illustrated in FIG. 4, and may vary depending on the number and arrangement of receiver optical fibers. Also, though not illustrated, it should be understood by one skilled in the art that the detector IC 51 includes all electronics and circuitry (for example in an area 53B) that are necessary to process signals received from the receiver optical fibers 1030 via the photodetector portions 52A–52F, as described in the '315 patent incorporated herein above. In some embodiments, an area 53A may provide connections between the photodetector portions 52A–52F and the circuitry in the region 53B. In other embodiments, the areas 53A and 53B may be merged and/or indistinguishable. The wiring regions 54 are provided (e.g., wire-bonding pads or other connection elements), from which wiring 55 may extend (see FIG. 5B). In various exemplary embodiments of the present invention, the detector IC 51 has at least two sides along which no external wiring is connected. In the illustrated example of FIG. 4, three sides 56A–56C do not have any external wiring connected, while all the wiring 55 comes out from a side 56D. Such arrangement may be beneficial for easy assembly of the detector IC 51 in a reference-surface block, to be described below.

Figure 5A:
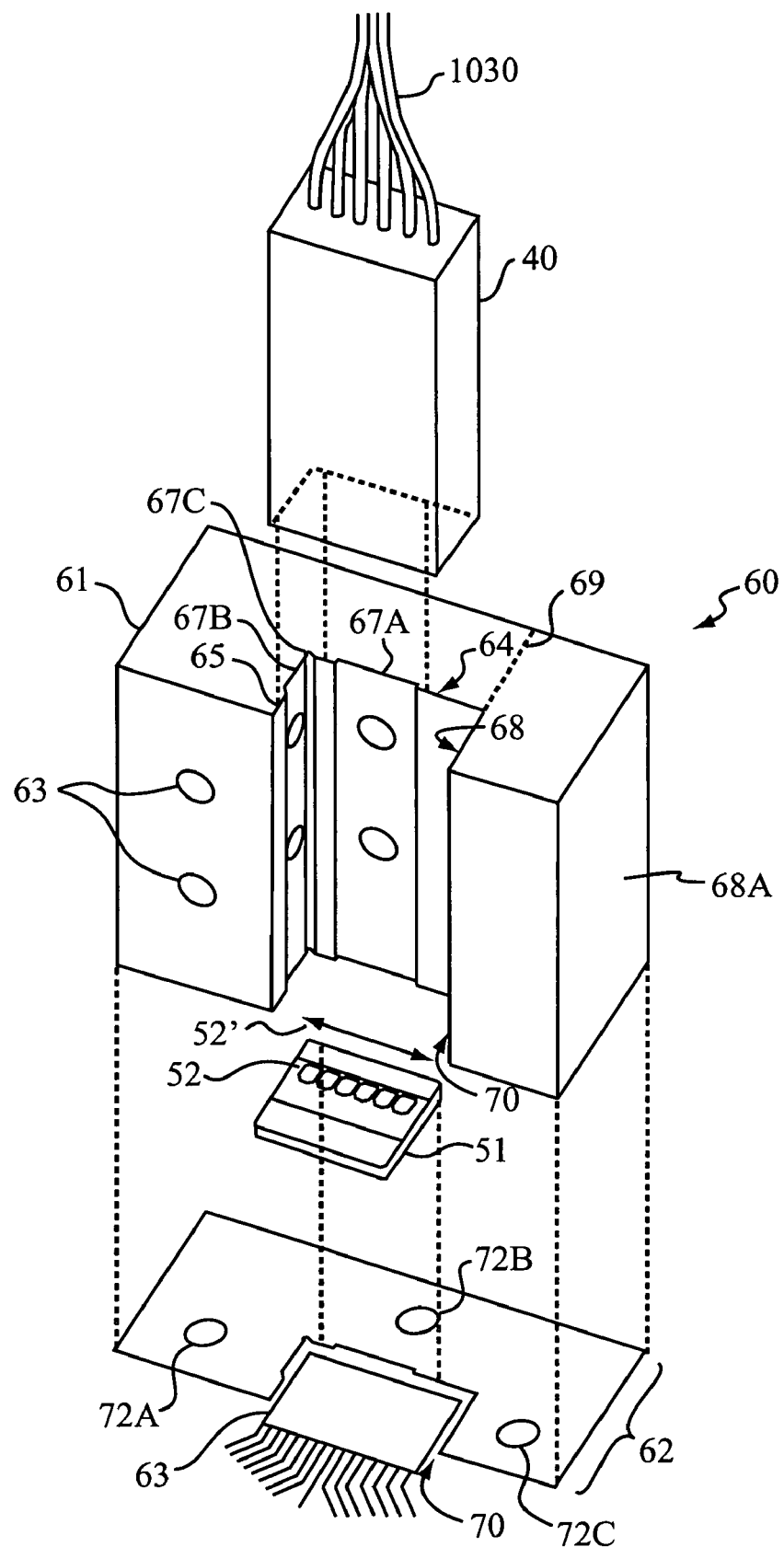
FIG. 5A is an exploded view of one embodiment of an alignment block arrangement including a detector IC, used for readily coupling a fiber-optic end piece (and hence receiver optical fibers mounted therein) with the detector IC in proper alignment, according to one embodiment of the present invention.
Figure 5B:
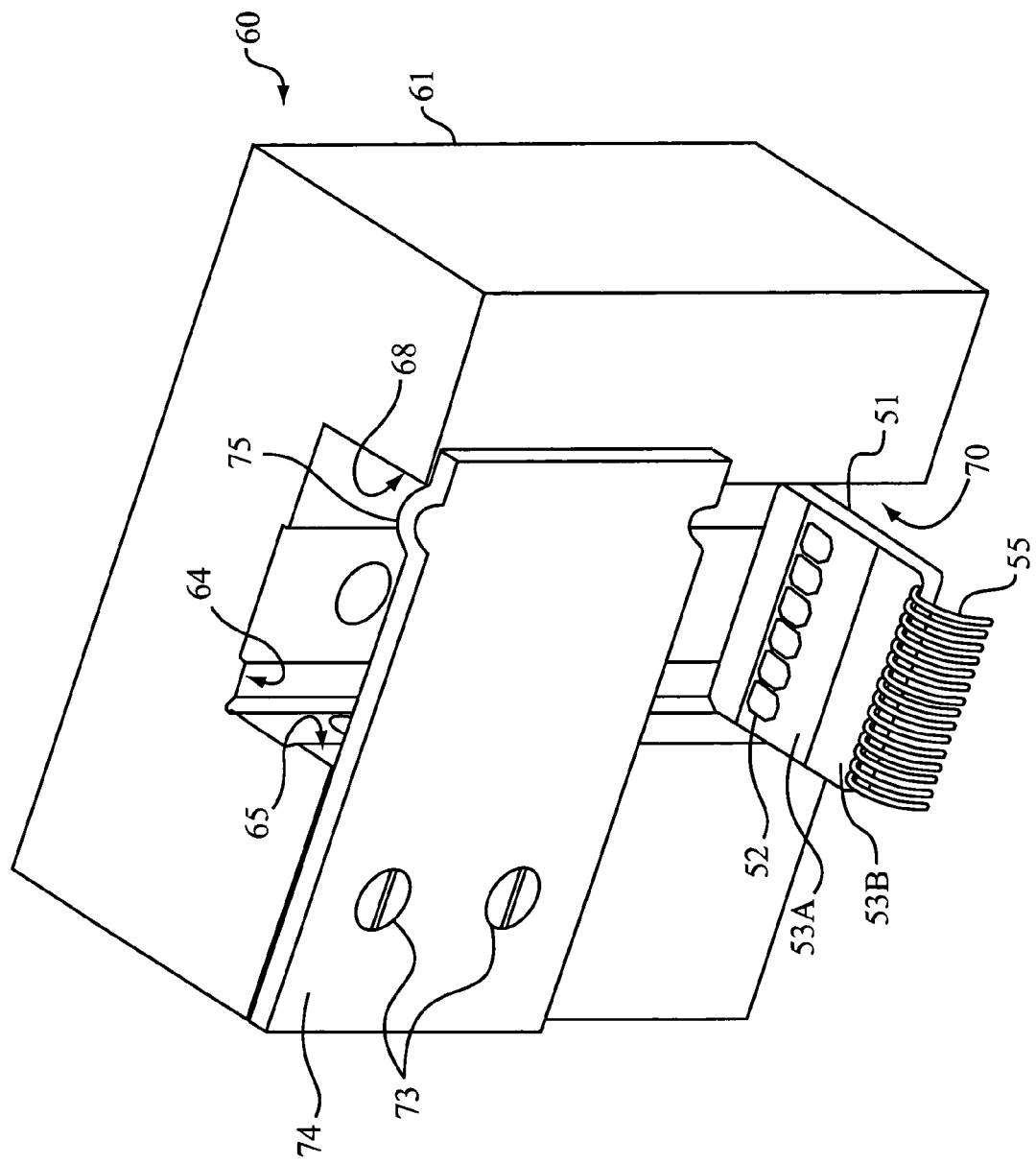
FIG. 5B shows the alignment block arrangement of FIG. 5A as assembled.

FIG. 5A illustrates, in an exploded view, one embodiment of an alignment block arrangement 60 according to one embodiment of the present invention. FIG. 5A further illustrates a fiber-optic end piece 40 to show how the alignment block arrangement 60 permits easy optical signal coupling between the fiber-optic end piece 40 and a detector IC 51, which is part of the alignment block arrangement 60, in proper alignment. FIG. 5B shows the alignment block arrangement 60 of FIG. 5A as assembled.

In FIG. 5A, the alignment block arrangement 60 consists of generally three elements: a reference-surface block 61, a substrate 62 defining a detector IC receiving area 63, and a detector IC 51. In one embodiment, the alignment block arrangement 60 is formed by securing the detector IC 51 to the substrate 62, to which the reference-surface block 61 is also secured. The substrate 62 may be a printed circuit board, of which the detector IC 51 is a component when it is secured in the detector IC receiving area 63. Once the detector IC 51 is secured to the substrate 62, the reference-surface block 61 may then be secured to the substrate 62 including the detector IC 51, in proper alignment with the detector IC 51, using any suitable means, to form the alignment block arrangement 60. For example, screws or pins may be used to extend through holes 72A–72C defined in the substrate 62 into the corresponding holes defined at the bottom of the reference-surface block 61 (not shown), and/or adhesive bonding may be used. Once the alignment block arrangement 60 is formed, the fiber-optic end piece 40 may be coupled to the alignment block arrangement 60, using "reference surfaces" provided by an element of the alignment block arrangement 60, to achieve proper alignment of the receiver optical fibers 1030 and the detector IC 51.

Specifically, in various embodiments, the reference-surface block 61 includes one or more reference surfaces, which are used to properly align the photodetectors of the detector IC 51 with the fiber-optic end piece 40 (and hence the receiver optical fibers 1030 mounted therein). In the illustrated embodiment, the reference-surface block 61 includes a first reference surface 64 and a second reference surface 65. Though the two reference surfaces 64 and 65 are generally orthogonal to each other in the illustrated embodiment, it should be understood that two reference surfaces may be provided in a different relative orientation depending on the configuration of the detector IC 51 and/or the fiber-optic end piece 40. In the embodiment shown in FIG. 5A, the first reference surface 64 includes a relief portion 67A and the second reference surface 65 includes a relief portion 67B, and a corner relief portion 67C is provided. The relief portions 67A–67B may each serve as relief that allows economical fabrication of a precisely functioning reference-surface block 61 by reducing the surface area that needs precise fabrication, including straightness and/or flatness, etc. The corner relief portion 67C eliminates the needs for precise corner fabrication, and allows a sharp-corner IC to abut the surfaces 64 and 65 without interference at the corner. The relief portions 67A–67C may also serve as a relief region for receiving excess glue, in embodiments where the detector IC 51 and/or the fiber-optic end piece 40 may be tacked or secured to the reference-surface block 61 by means of adhesive. In one embodiment, the reference-surface block 61 may include screw holes 63 for mounting a compliant retainer 74 (see FIG. 5B.) The reference-surface block 61 may be formed using any suitably precise method, such as conventional machining, molding, micro-machining, or the like, or a combination thereof.

The reference-surface block 61 may further define a third surface 68, though in the illustrated embodiment this surface does not contact the detector IC 51 and/or the fiber-optic end piece 40 in their assembled position. For example, in the embodiment illustrated in FIGS. 5A and 5B, a space 70 is provided between the detector IC 51 and the fiber-optic end piece 40 relative to the third surface 68. Thus, the third surface 68 guides, but does not restrict, insertion of the fiber-optic end piece 40 in the space defined by the first and second reference surfaces 64 and 65. In some embodiments, the reference-surface block 61 may exclude a portion 68A, for example ending with a surface at the plane of the dotted line 69 (making a generally L-shaped reference-surface block 61). Further, in some embodiments, a reference-surface block 61 may define only one reference surface, against which a corresponding-reference surface of the fiber-optic end piece 40 is abutted for the purpose of simplifying and/or enhancing alignment along at least one direction. In one embodiment, such alignment may be facilitated by elongating the photodetectors portions of the detector IC 51 along a direction parallel to the reference surface, and forming the end piece 40 to position the ends of its included receiver optical fibers 1030 at the nominal centers of the elongated photodetector portions. For example, with reference to FIG. 5A, if the reference surface 65 is not included, then the photodetectors 52 may be additionally elongated (compared to FIG. 5A) along the direction 52' parallel to the reference surface 64, and the end piece 40 may be formed to position the ends of its included receiver optical fibers 1030 at the nominal centers of the additionally elongated photodetector portions. Thus, the respective receiver optical fibers 1030 may be aligned within the limits of their respective photodetectors when using a positioning tolerance range that may be achieved with manual or automatic positioning methods while sliding the end piece 40 in an abutting relationship along the one reference surface, in order to achieve acceptable alignment.

In one method of assembly of the illustrated embodiment, the detector IC 51 may be positioned within a desired tolerance relative to the detector IC receiving area 63 of the substrate 62 (e.g., using a position tolerance achievable by conventional pick and place fabrication equipment) and bonded in place. Wiring 55 (see FIG. 5B) may then be automatically or manually provided (e.g., by wire-bonding) between the wiring regions 54 and corresponding circuit connections included on the substrate 62. Then, the reference-surface block 61 may be positioned against the detector IC 51 in such a manner that the first reference surface 64 and the second reference surface 65 snugly abut the corresponding edges of the detector IC 51 (see FIG. 5B.), and the reference-surface block 61 may then be fastened to the substrate 62, as previously outlined. It will be understood that the dimensional relationship between the photodetectors 52A–52F and any or all of the edges 56A–56D of the detector IC 51 may be held within a relatively small tolerance (e.g., 10 micrometers) during conventional IC dicing operations. Thus, this embodiment of the method of positioning the reference-surface block 61 is particularly advantageous for economically locating the first reference surface 64 and the second reference surface 65 relative to the photodetectors of the detector IC 51 with only a small position tolerance accumulation. The fiber-optic end piece 40 may then be positioned relative to the reference-surface block 61 in such a manner that its corresponding surfaces snugly abut both the first reference surface 64 and the second reference surface 65. Thus, this embodiment of the method of positioning the end piece 40 is particularly advantageous for economically aligning the end piece 40 and the ends of its included receiver optical fibers 1030 relative to the photodetector portions 52A–52F of the detector IC 51 with only a small position tolerance accumulation.

As shown in FIG. 5B, in one embodiment, a compliant retainer 74 may be mounted to the reference-surface block 61, for example by means of screws 73 in screw holes 63. In one embodiment, the compliant retainer 74 contacts the end piece 40 with sufficient force to hold it in the desired position against the reference surface(s) and the detector IC 51 during operation of the optical encoder and associated circuits. In such an embodiment, the end piece 40 may be easily removed and replaced if desired. In other embodiments, adhesive may be added to lock the end piece 40 at the desired position. In one embodiment, the compliant retainer 74 may include a detent portion 75, that contacts a corner of the end piece 40 such that it is forced against both of the reference surfaces 64 and 65. In one embodiment, when the fiber-optic end piece 40 is received in the alignment block arrangement 60, UV-curable adhesive, or a non-adhesive gap filler, may be used between the fiber-optic end piece 40 and the detector IC 51 to fill any gap and minimize reflections. When assembled, the fiber-optic end piece 40 is properly aligned to couple the optical signals from the optical fibers to the photodetectors, and the end of the end piece 40 may be and in contact with the detector IC.

In one embodiment, photodiodes used in the photodetector portions 52A–52F are Nwell/Psub, and these are the only devices provided beneath the fiber-optic end piece 40, though in other embodiments other devices may also be provided beneath the fiber-optic end piece 40. In any embodiment, in accordance with various exemplary embodiments of the present invention, the area around the photodiodes may be built-up with a stack-up of multiple layers, M1, M2 and M3, to create a high area surrounding the photodiodes so as to ensure that the fiber-optic end piece 40 will sit flat on the surface adjacent to the photodiodes without damaging the photodiodes. Specifically, M1 and M2 are used as connection layers to ground (GND), and M3 is a top protective layer used entirely across, or substantially entirely across, the detector IC 51 as an optical shield. In one embodiment, when devices other than photodiodes are provided underneath the fiber-optic end piece 40, the stack-up of M1, M2 and M3 still provides the highest point relative to the plane of the substrate 62 so that the fiber-optic end piece 40 will sit flat without damaging any devices.

In various embodiments, as shown in FIGS. 4 and 5B, the detector IC 51 includes a reasonable clearance (generally in the area 53A and/or 53B) between the photodetector portions 52A–52F and the wiring 55 extending from the wiring regions 54 such that there is a low risk of damaging wire bonds or the like while positioning the end piece 40 relative to the detector IC 51. In one embodiment, the area 53A is sufficiently large that the end piece 40 has a reasonable nominal clearance relative to any critical circuit elements included in the area 53B, such that there is a low risk of damaging or otherwise affecting the operation of circuit elements in the area 53B while positioning the end piece 40 relative to the detector IC 51.

Figure 6:
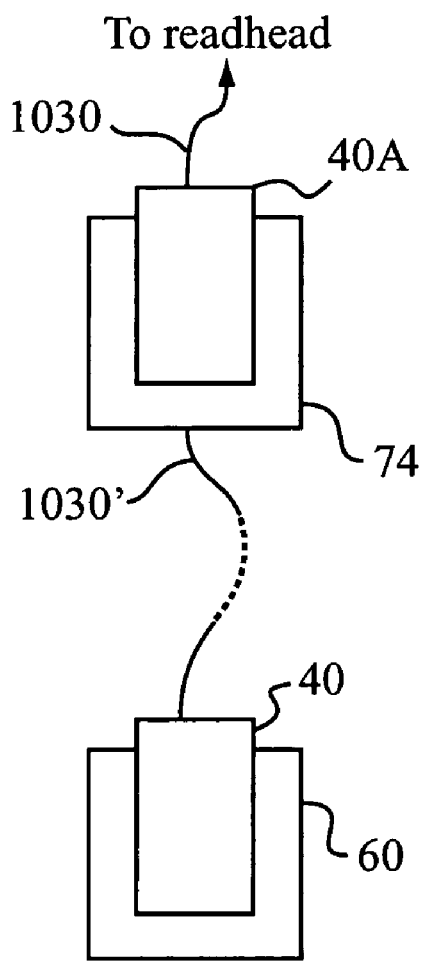
FIG. 6 schematically illustrates the use of a fiber-optic connector to extend the length of receiver optical fibers, in accordance with one aspect of the present invention.

FIG. 6 illustrates the use of a fiber-optic end piece 40A, together with a suitable connector element 74, to extend the length of the receiver optical fibers 1030 (and 1030'). Specifically, the receiver optical fibers 1030 from an encoder readhead initially terminate in the fiber-optic end piece 40A having optical fiber locating features (e.g., V grooves) as discussed above. The fiber-optic end piece 40A may be identical to the end piece in various embodiments. The fiber-optic end piece 40A is coupled with the connector element 74, which forwards the received optical signals via a further extension set of receiver optical fibers 1030' to the fiber-optic end piece 40. In one embodiment, the connector element 74 may include reference surfaces similar to those included in the reference-surface block 61, for the purpose of aligning the optical fibers included in the end piece 40A with the optical fibers included connector element 74, in a manner analogous to that previously described with reference to the reference-surface block 61. The fiber-optic end piece 40 is coupled with an alignment block arrangement 60 including a detector IC 51, as discussed above. It should be understood that any number of such fiber-optic end pieces 40A (40) may be provided, together with the corresponding number of connecting elements 74, so as to extend the length of the receiver optical fibers 1030 (1030').

While the preferred embodiments of the invention have been illustrated and described, it will be appreciated that the invention includes various features that may be used separately or in various combinations, and that various changes can be made therein without departing from the spirit and scope of the invention.

The embodiments of the invention in which an exclusive property or privilege is claimed are defined as follows:

1. A method for connecting optical signals carried by optical fibers between an optical encoder readhead and an optical signal processing circuit including an optical signal processing IC, the method comprising:
    providing an optical signal processing IC having a plurality of photodetector portions arranged in a photodetector configuration;
    fixing the optical signal processing IC to a substrate at a first position and orientation;
    fixing a reference-surface block to the substrate in a second orientation and position based on the first position and orientation, the reference-surface block having at least a first reference surface;
    providing a fiber-optic end piece having at least a first corresponding-reference surface and a plurality of optical fiber locating features arranged relative to the first corresponding-reference surface and in a configuration that corresponds to the photodetector configuration;
    fixing a plurality of the optical fibers to the plurality of optical fiber locating features to provide a coupling configuration of optical fiber ends that nominally matches the photodetector configuration; and
    mounting the end piece relative to the reference-surface block such that the first corresponding-reference surface of the fiber-optic end piece abuts the first reference surface of the reference-surface block, the coupling configuration of optical fiber ends is aligned with the photodetector configuration, and the optical fiber ends and an end of the end piece are located proximate to a surface of the optical signal processing IC.

2. The method of claim 1, wherein the reference-surface block has a second reference surface, the fiber-optic end piece has a second corresponding-reference surface relative to which the plurality of optical fiber locating features are arranged, and the end piece is mounted relative to the reference-surface block such that the second corresponding-reference surface of the fiber-optic end piece abuts the second reference surface of the reference-surface block.

3. The method of claim 1, wherein the axes of the optical fibers in the end piece are oriented approximately normal to the surface of the optical signal processing IC when the end piece is mounted.

4. The method of claim 1, wherein a gap-filling substance is provided between the optical fiber ends and the surface of the optical signal processing IC.

5. The method of claim 1, further comprising the step of polishing the optical fiber ends of the plurality of the optical fibers after they are fixed in the plurality of optical fiber locating features.

6. The method of claim 5, wherein the step of polishing the optical fiber ends comprises polishing the optical fiber ends to be nominally coplanar with each other and with the end of the end piece.

7. The method of claim 1, wherein the step of fixing the reference-surface block to the substrate comprises arranging the first reference surface of the reference-surface block and a side of the optical signal processing IC to abut each other.

8. The method of claim 1, wherein the optical signal processing IC includes at least one portion that extends out from under the end piece when the end piece is mounted.

9. The method of claim 8, wherein the at least one portion that extends out from under the end piece includes at least one of a) a wiring region, b) a circuitry region, c) a clearance region between the end piece and a wiring region and d) a clearance region between the end piece and a circuitry region.

10. An alignment block arrangement for connecting optical signals carried by optical fibers between an optical encoder readhead and an optical signal processing circuit including an optical signal processing IC having a plurality of photodetector portions arranged in a photodetector configuration, the alignment block arrangement comprising:
 a substrate;
 the optical signal processing IC fixed to the substrate at a first position and orientation; and
 a reference-surface block fixed to the substrate in a second orientation and position based on the first position and orientation, the reference-surface block having at least a first reference surface, the first reference surface being configured to abut a first corresponding-reference surface of a fiber-optic end piece having the optical fibers arranged relative to the first corresponding-reference surface and in a coupling configuration that corresponds to the photodetector configuration.

11. The alignment block arrangement of claim 10, wherein the substrate comprises a printed circuit board.

12. The alignment block arrangement of claim 11, wherein the first reference surface of the reference-surface block and a first side of the optical signal processing IC abut each other.

13. The alignment block arrangement of claim 10, wherein the reference-surface block has a second reference surface, configured to abut a second corresponding-reference surface of the fiber-optic end piece.

14. The alignment block arrangement of claim 13, wherein the first reference surface of the reference-surface block and a first side of the optical signal processing IC abut each other and the second reference surface of the reference-surface block and a second edge of the optical signal processing IC abut each other.

15. The alignment block arrangement of claim 13, wherein the first and second reference surfaces are oriented approximately normal to the surface of the optical signal processing IC.

16. The alignment block arrangement of claim 13, further comprising a compliant element that is positioned to engage the fiber-optic end piece when the end piece is mounted, such that the first and second corresponding-reference surfaces of the fiber-optic end piece are forced to abut the first and second reference surfaces of the reference-surface block.

17. The alignment block arrangement of claim 10, wherein the optical signal processing IC includes at least one portion that extends out from under the end piece when the end piece is mounted.

18. The alignment block arrangement of claim 17, wherein the at least one portion that extends out from under the end piece includes at least one of a) a wiring region, b) a circuitry region, c) a clearance region between the end piece and a wiring region and d) a clearance region between the end piece and a circuitry region.

19. The alignment block arrangement of claim 10, further comprising the fiber optic end piece mounted relative to the reference-surface block such that the first corresponding-reference surface of the fiber-optic end piece abuts the first reference surface of the reference-surface block, the coupling configuration of optical fiber ends is aligned with the photodetector configuration and the optical fiber ends and an end of the end piece are located proximate to a surface of the optical signal processing IC.

20. The alignment block arrangement of claim 19, wherein the end piece is connected to one of a) the optical encoder readhead and b) an extension set of receiver optical fibers that carries optical signals originating in the optical encoder readhead.

* * * * *